United States Patent
Morinaga et al.

(10) Patent No.: US 8,804,211 B2
(45) Date of Patent: Aug. 12, 2014

(54) IMAGE READING APPARATUS

(71) Applicant: Canon Kabushiki Kaisha, Tokyo (JP)

(72) Inventors: Kazuyuki Morinaga, Machida (JP); Kaneto Tokuyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/918,089

(22) Filed: Jun. 14, 2013

(65) Prior Publication Data

US 2014/0029070 A1  Jan. 30, 2014

(30) Foreign Application Priority Data

Jul. 27, 2012 (JP) ................. 2012-167646

(51) Int. Cl.
H04N 1/04 (2006.01)

(52) U.S. Cl.
USPC ........... 358/497; 358/498; 358/496; 399/367; 271/10.01; 271/288

(58) Field of Classification Search
CPC ............ H04N 1/12; H04N 2201/0081; H04N 2201/044; H04N 1/121; H04N 1/00602; H04N 2201/04725; H04N 1/04; H04N 2201/04756; H04N 1/00082; H04N 1/0057; H04N 1/00588
USPC ......... 358/474, 498, 497, 406, 496, 448, 453, 358/482, 494; 399/49, 258, 21, 388, 407, 399/45, 48, 367; 271/228, 10.01, 114, 117, 271/121, 171, 18, 207, 264, 279, 314, 3.14, 271/9.08

See application file for complete search history.

(56) References Cited

U.S. PATENT DOCUMENTS 6,151,478 A * 11/2000 Katsuta et al. ................ 399/372
6,801,344 B2    10/2004 Morinaga et al. ............. 358/474
7,072,082 B2 *  7/2006 Yokota ........................... 358/497
7,088,475 B1    8/2006 Terashima et al. ............ 358/448
7,123,386 B2 * 10/2006 Tanaka et al. ................. 358/474
7,327,497 B2 *  2/2008 Sugeta et al. ................. 358/461
7,391,544 B2 *  6/2008 Yokota ........................... 358/487
7,446,909 B2 * 11/2008 Hashizume ................... 358/474
7,477,425 B2 *  1/2009 Haas et al. .................... 358/474
7,502,147 B2 *  3/2009 Suzuki et al. ................. 358/504
7,821,685 B2 * 10/2010 Yoshihisa ...................... 358/497
8,072,653 B2   12/2011 Iwata et al. ................... 358/474
8,213,059 B2 *  7/2012 Yamazaki ..................... 358/474
8,253,986 B2 *  8/2012 Ikeno et al. ................... 358/461
8,253,988 B2 *  8/2012 Inukai .......................... 358/474
8,264,752 B2 *  9/2012 Katsuyama ................... 358/498
2002/0131092 A1  9/2002 Tanaka et al. ................. 358/474
2008/0266614 A1 10/2008 Doan et al. ................... 358/474

FOREIGN PATENT DOCUMENTS

JP     01-266529    10/1989
JP      3810643 B    8/2006

OTHER PUBLICATIONS

U.S. Appl. No. 13/918,140, filed Jun. 14, 2013.

* cited by examiner

Primary Examiner — Negussie Worku
(74) Attorney, Agent, or Firm — Fitzpatrick, Cella, Harper & Scinto

(57) ABSTRACT

An image reading apparatus comprises a feeding mechanism conveying a document, a moving mechanism moving a reading unit, a driving source shared by the mechanisms, a biasing mechanism moving the reading unit to a predetermined position by an elastic member when the reading unit is moved out of a reading region, a transmission element being displaced by the movement of the reading unit and switching transmission of the drive force, and a disengaging mechanism disengaging the reading unit in the predetermined position to the reading region from the predetermined position by the drive force of the driving source.

9 Claims, 11 Drawing Sheets

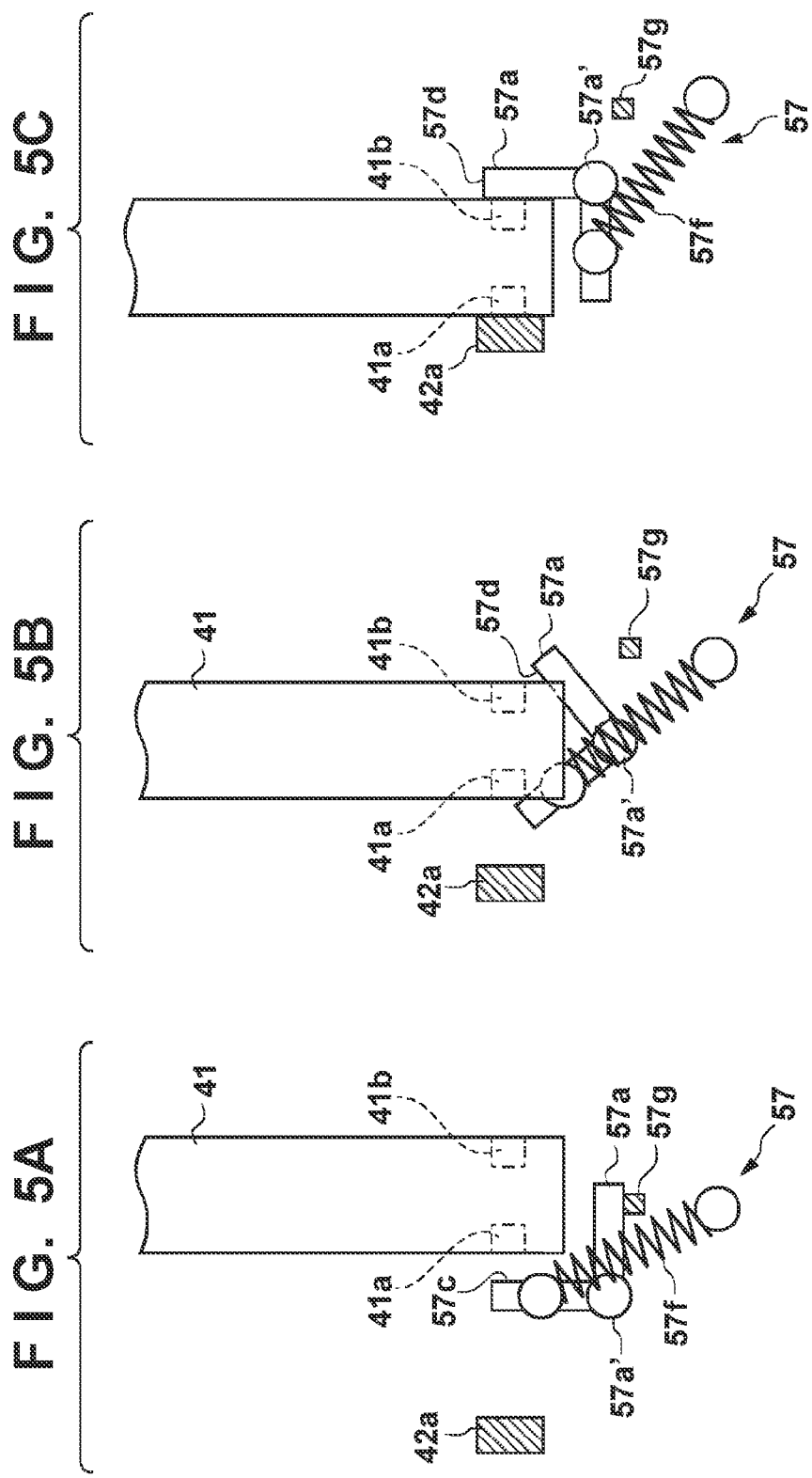

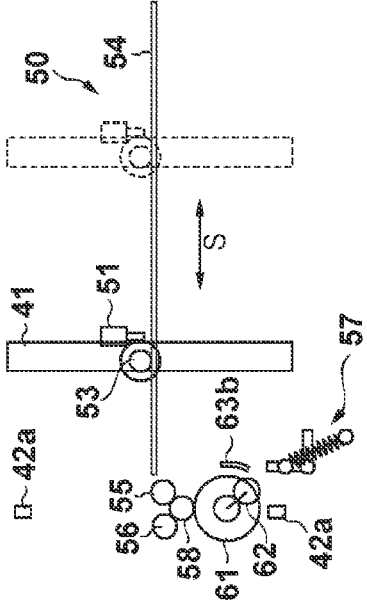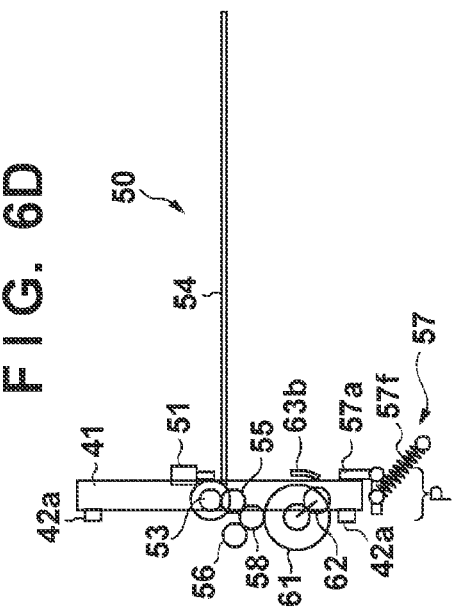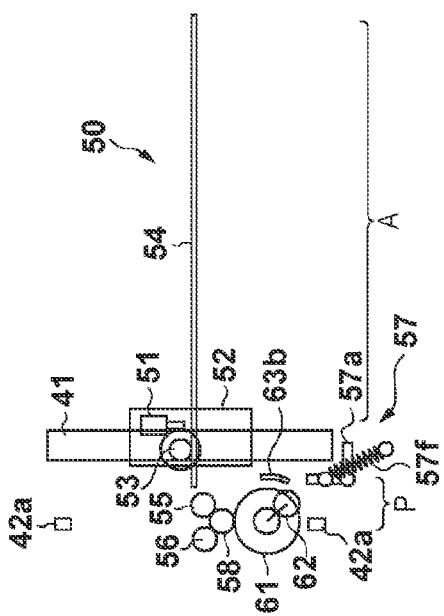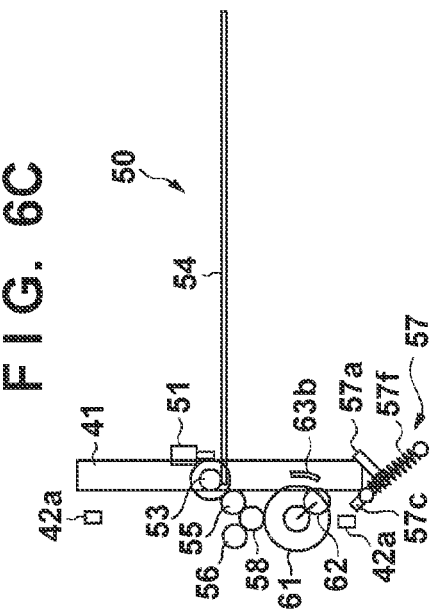

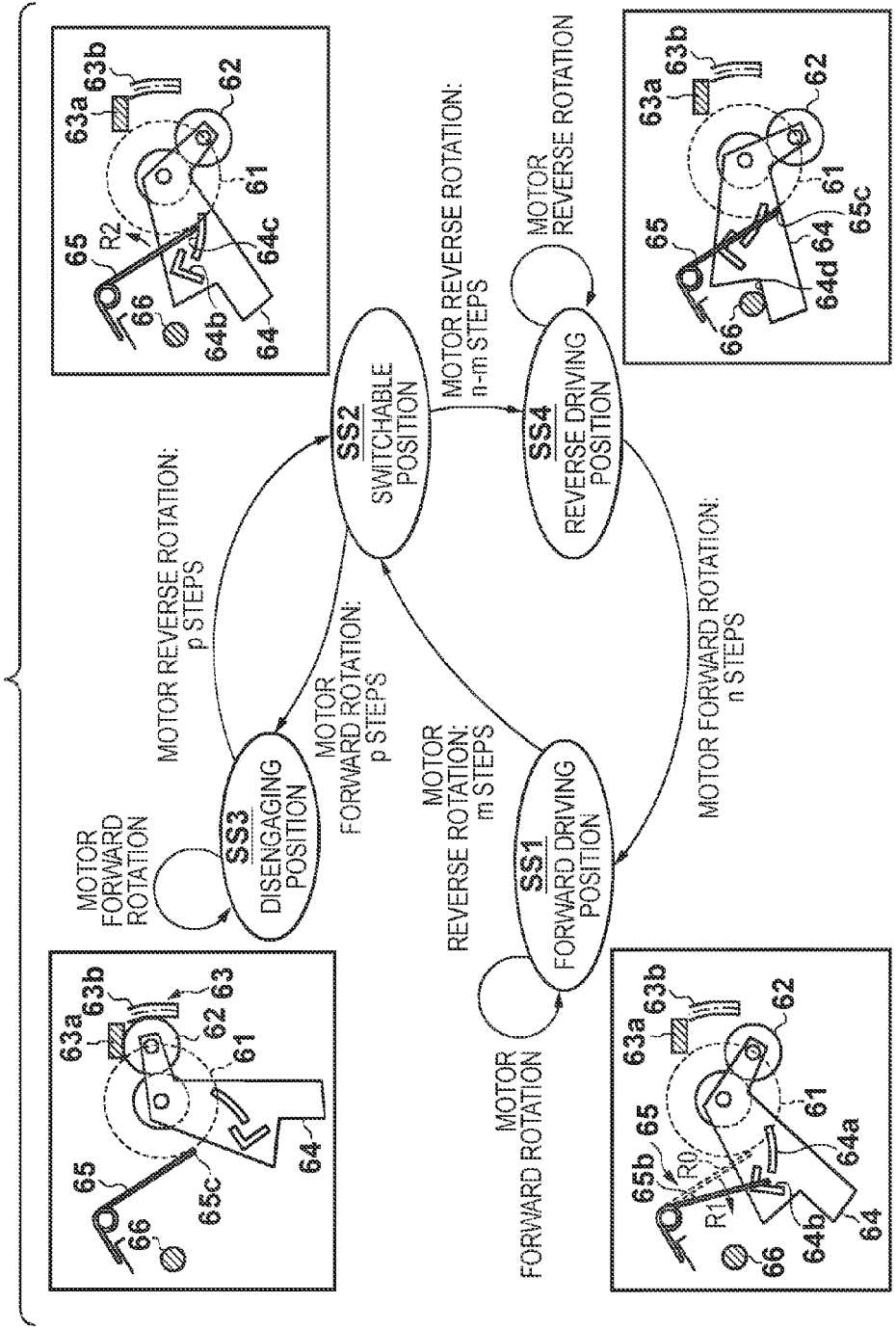

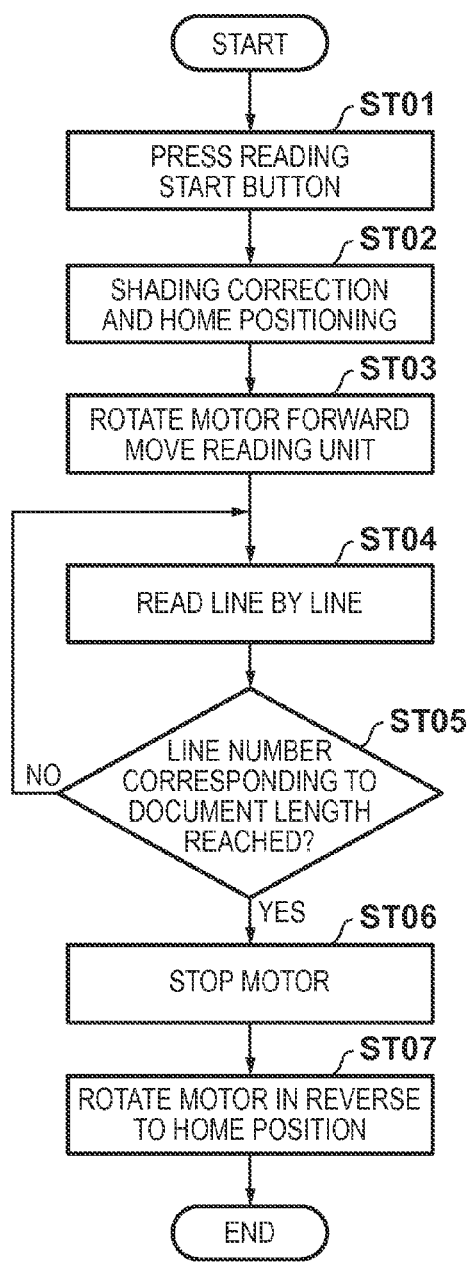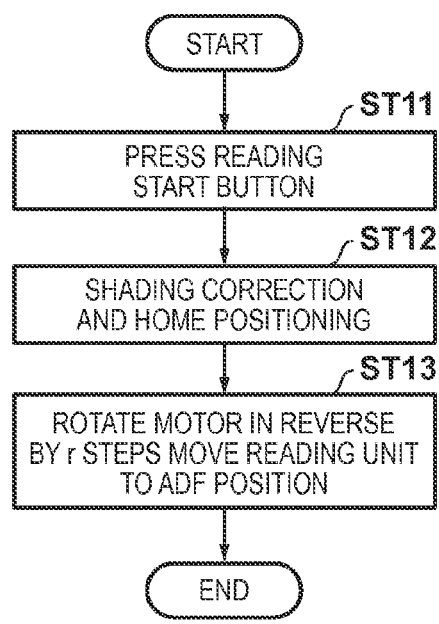

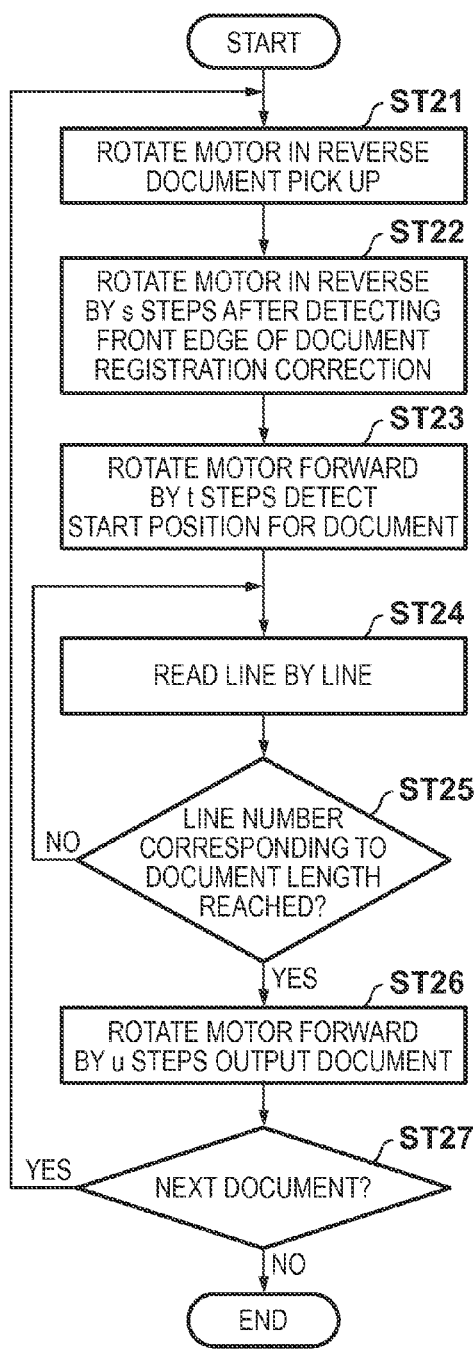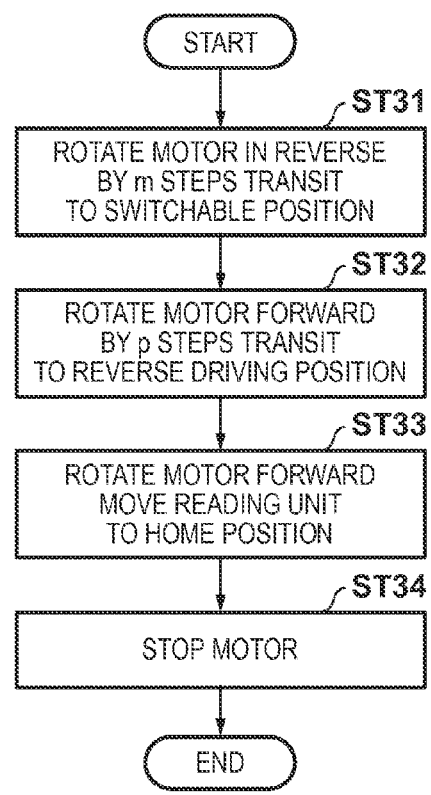
FIG. 9A
FIG. 9B

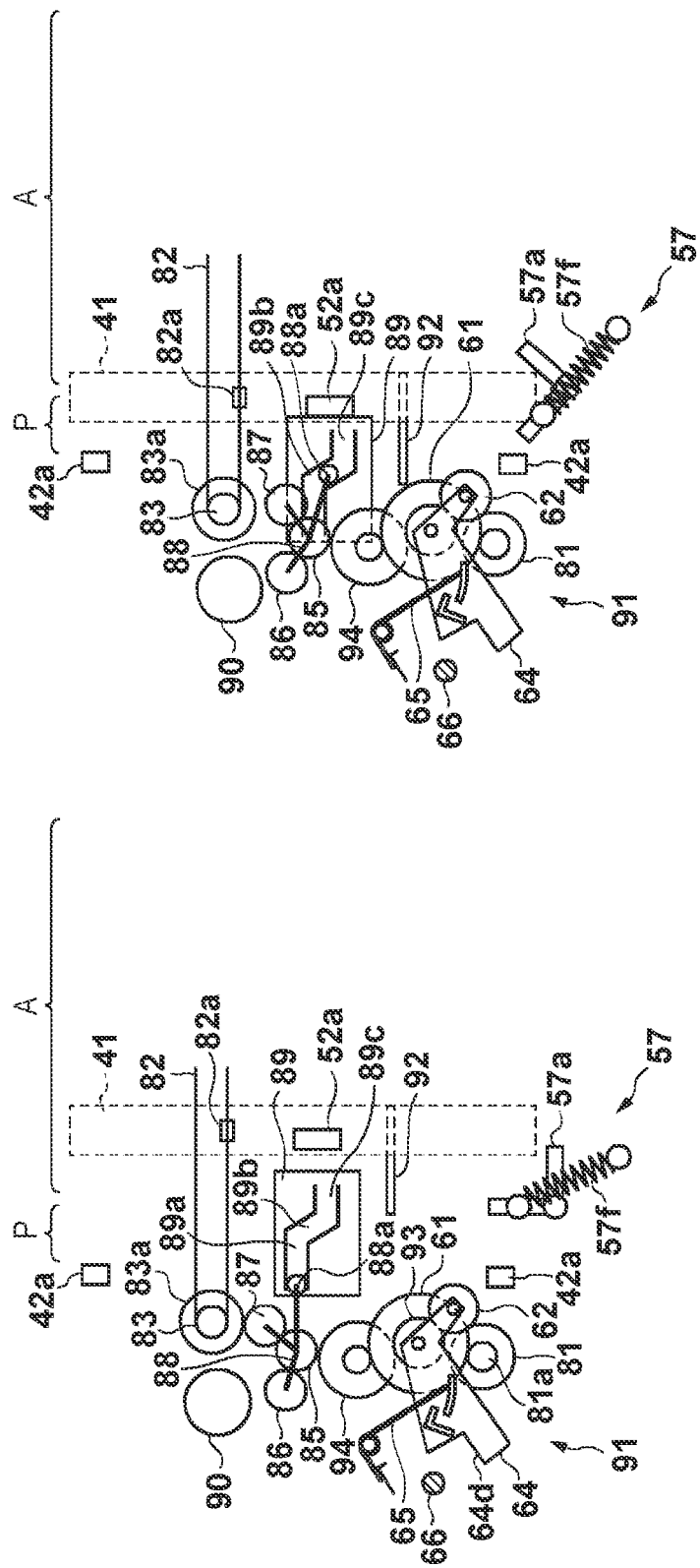

IMAGE READING APPARATUS

BACKGROUND OF THE INVENTION

1. Field of the Invention

This invention relates to an image reading apparatus.

2. Description of the Related Art

Among image reading apparatuses such as copy machines and the like, some apparatuses are known to have a capability to select between two types of document reading manners. A first document reading manner is a fixed document reading mode by a flat bed scanner (FBS), in which a document placed on a platen is read while moving a reading unit placed thereunder. A second document reading manner is a conveyance document reading mode, in which a document auto-fed by an automatic document feeder (ADF) is read by a reading unit fixed at a predetermined position. In the conveyance document reading mode, a large amount of papers with a predefined size can be automatically read efficiently. Similarly, in the fixed document reading mode, a document which is difficult to be conveyed such as a book or a 3D object can be read.

Normally in an image reading apparatus having the two modes described above, a motor, for example, as a driving source for the ADF is required, and aside from this, another motor, for example, as a driving source for moving the reading sensor is required. Similarly, two drivers in total to drive these driving sources are required, so that it has become one factor contributing to an increase in cost of an apparatus.

Therefore, an apparatus has been proposed, in which a driving source for the ADF and a driving source for moving the reading unit are combined into one, and these are driven by a single driving source. For example, in Japanese Patent Laid-Open No. 1-266529, an apparatus is proposed, in which a motor is shared and units to which a driving force is transmitted are switched by an electromagnetic clutch. However, since an electromagnetic clutch is a relatively expensive mechatronic part, a large cost reduction is not easily realized. Therefore, apparatuses in which the number of mechatronic parts is reduced are proposed in US-2008-0266614 and in Japanese Patent No. 3810643, compared with the apparatus proposed in the Japanese Patent Laid-Open No. 1-266529.

However, in the configuration described in US-2008-0266614 and in the Japanese Patent No. 3810643, the conveyance direction of a document by an ADF is restricted to one direction. When the conveyance direction of a document is restricted to one direction, a recovering operation after document jam processing, or reverse conveyance for a skew correction (registration) of a document cannot be performed. Similarly, in order to add a two-sided reading function, reverse conveyance becomes necessary to reverse the document. Therefore, the performance of a product needs to be necessarily degraded, such as cutting some functions that the apparatus can perform.

The reason why the conveyance direction of a document is restricted to one direction resides in that a driving target of the driving force of a motor serving as a common driving source is switched between an ADF and a mechanism to move a reading unit by the drive force of the motor itself. In this configuration, when the motor is rotated in the direction to reversely convey the document, the transmission destination of the driving force is returned to the mechanism to move the reading sensor, so that the conveyance direction cannot to be switched.

SUMMARY OF THE INVENTION

An aspect of the present invention is to provide an apparatus which does not depend on a drive force of a driving source to switch the transmission destination of the driving force, so that the direction of a document conveyance can be switched.

According to an aspect of the present invention, there is provided an image reading apparatus comprising: a reading unit configured to read a document on a platen; a feeding mechanism configured to convey a document when reading a document that is conveyed onto the platen in which the reading unit is fixed at a predetermined position; a moving mechanism configured to move the reading unit when reading a document that is placed on the platen in which the reading unit is moved within a reading region that is separated from the predetermined position; a driving source that is shared by the moving mechanism and the feeding mechanism; a biasing mechanism that includes an elastic member and is configured to move the reading unit to the predetermined position by a biasing force of the elastic member in a case where the reading unit is moved from the reading region out of the reading region by the moving mechanism; a transmission element configured to be displaced by the movement of the reading unit, and to switch between transmission of the drive force of the driving source to the moving mechanism and transmission of the drive force of the driving source to the feeding mechanism; and, a disengaging mechanism configured to disengage the reading unit that is in the predetermined position to the reading region from the predetermined position by the drive force of the driving source.

Further features of the present invention will become apparent from the following description of exemplary embodiments (with reference to the attached drawings).

BRIEF DESCRIPTION OF THE DRAWINGS

FIGS. 5A to 5C are diagrams illustrating an operation of the biasing mechanism.

FIGS. 6A to 6D are diagrams illustrating a moving manner of a reading unit.

FIG. 7 is a state transition diagram of the disengaging mechanism.

FIGS. 8A and 8B are flowcharts illustrating an exemplary control.

FIGS. 9A and 9B are flowcharts illustrating an exemplary control.

FIGS. 11A and 11B are diagrams illustrating an operation of the exemplary mechanism in FIGS. 10A and 10B.

DESCRIPTION OF THE EMBODIMENTS

First Embodiment

Figure 1:
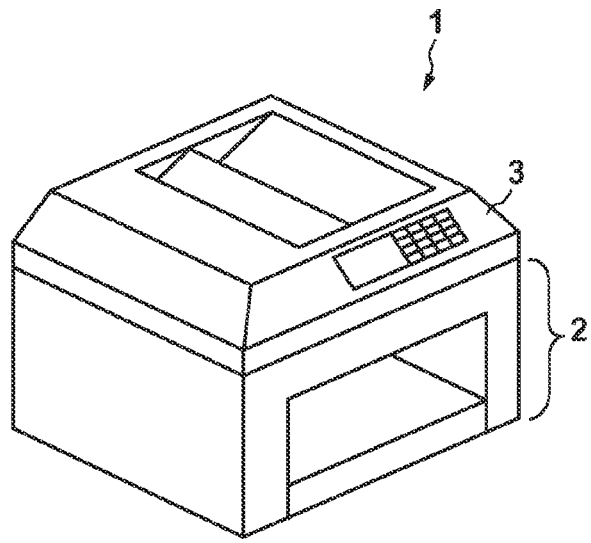
FIG. 1 is a perspective illustration of an image reading apparatus according to an embodiment of the present invention.

FIG. 1 is a schematic diagram of an image reading apparatus 1 according to an embodiment of the present invention. The image reading apparatus 1 includes a main unit 2 and a opening/closing unit 3 that can be opened and closed mounted on the main unit 2, and is configured as a copy machine or a multifunction peripheral (so called MFP), for example. The main unit 2 includes, for example, a recording paper feeding unit that feeds a recording paper sheet by sheet, a printing unit that prints an image on the recording paper, a conveyance unit that conveys the recording paper to the printer unit, and a paper ejection unit that ejects the recording paper on which printing is completed. The opening/closing unit 3 includes a feeding mechanism (automatic document feeder: ADF), which will be described later.

Figure 2:
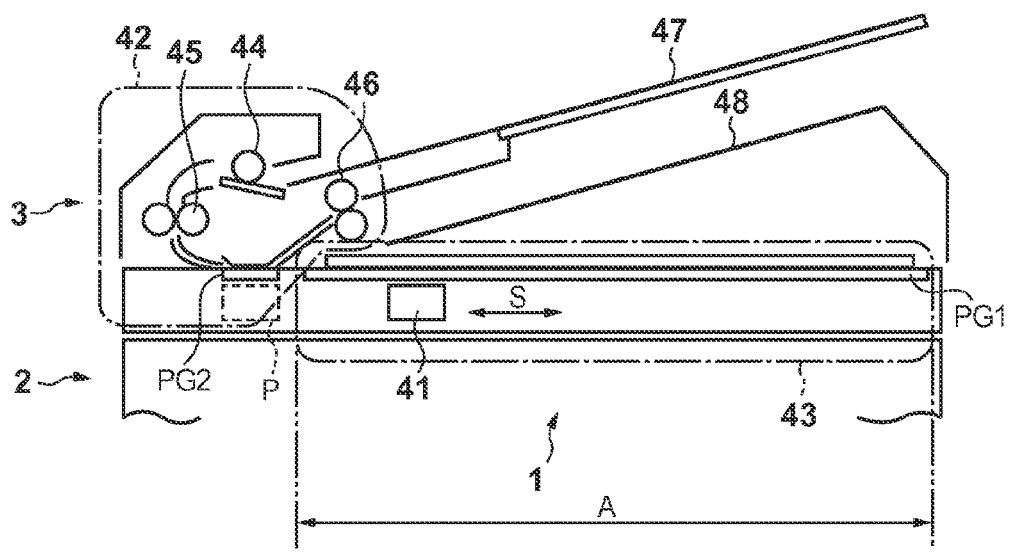
FIG. 2 is a partial cross-sectional diagram of an image reading apparatus in FIG. 1.

FIG. 2 is a partial cross-sectional diagram of the image reading apparatus 1, and illustrates schematically the structure of an upper portion of the main unit 2 and the opening/closing unit 3. On the upper surface of the main unit 2, a platen glass PG1 and an ADF glass PG2, which constitute a platen, are provided.

Under the platen glass PG1 and the ADF glass PG2, a reading unit 41 is provided. The reading unit 41 includes, for example, a line sensor (image sensor), and reads a document on the platen (on the platen glass PG1 and the ADF glass PG2) from thereunder.

The platen glass PG1 and the reading unit 41 constitute a flat bed scanner 43. The reading unit 41 can be moved back and forth by a moving mechanism, which will be described later, in a direction designated by the arrow S along a planar direction of the platen glass PG1. A document placed on the platen glass PG1 can be read by moving the reading unit 41 in the region A (inside a moving reading region), which corresponds to the width of the platen glass PG1 (fixed document reading mode).

Moreover, the reading unit 41 is movable to an ADF position (fixed reading position P) under the ADF glass PG2 by a biasing mechanism, which will be described later. The fixed reading position P is arranged at a distance from the moving reading region A in the direction S. The opening/closing unit 3 includes a feeding mechanism 42 on the ADF glass PG2, which can automatically convey a document, and the reading unit 41 whose position is fixed in the fixed reading position P reads a document that is conveyed on the ADF glass PG2 (conveyance document reading mode).

The feeding mechanism 42 includes a separation roller unit 44, a conveyance roller unit 45, and an output roller unit 46. The separation roller unit 44 separates a document stacked on a document stack tray 47 sheet by sheet. The conveyance roller unit 45 conveys a document, which is separated and conveyed sheet by sheet, to the ADF glass PG2. The output roller unit 46 outputs a document that has been read to the output tray 48.

Figure 3:
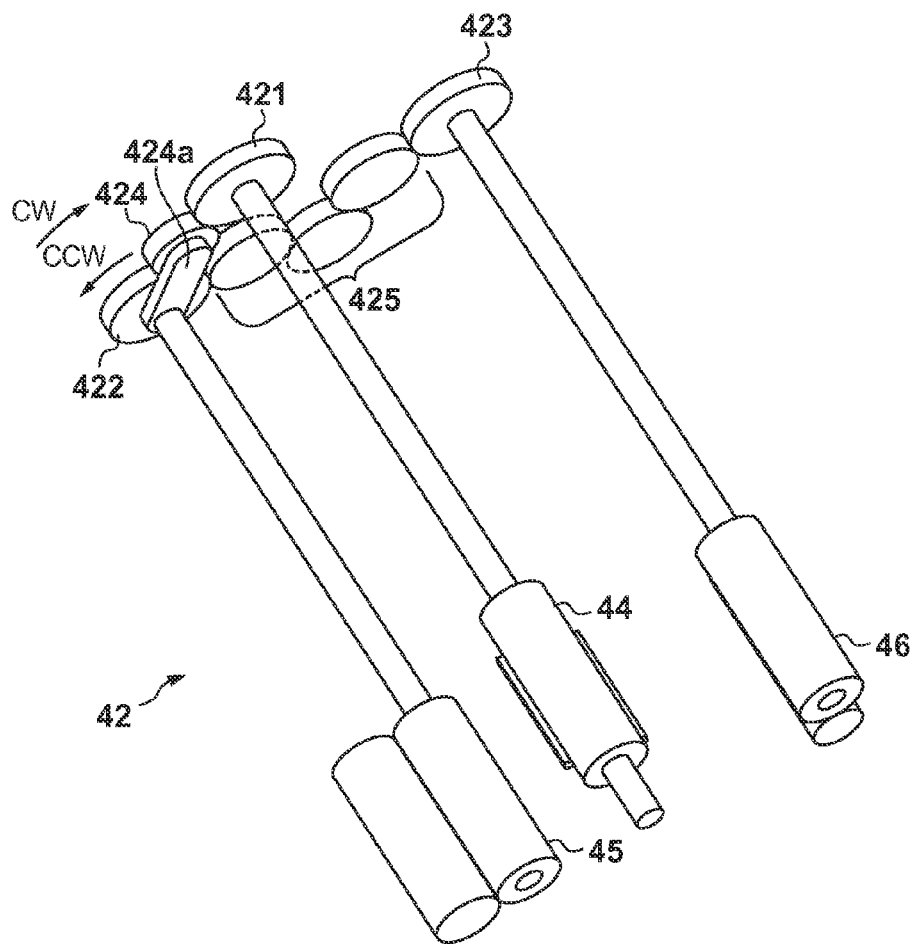
FIG. 3 is a diagram illustrating a feeding mechanism.

FIG. 3 is a diagram illustrating the feeding mechanism 42. A separation roller gear 421 drives the separation roller unit 44. A conveyance roller gear 422 drives the conveyance roller unit 45. An output roller gear 423 drives the output roller unit 46. A planetary gear 424 is supported rotatably by a carrier 424a. The carrier 424a is supported pivotably by a shaft of the conveyance roller gear 422. The planetary gear 424 meshes with the separation roller gear 421 when it pivots clockwise in the diagram (in the direction designated by the arrow CW), and resolves meshing with the separation roller gear 421 when it pivots counterclockwise in the diagram (in the direction designated by the arrow CCW). Drive force is transmitted to the conveyance roller gear 422 and the output roller gear 423 by a relay gear train 425.

The conveyance roller unit 45 and the output roller unit 46 are configured to rotate in the same direction as the direction of conveyance of a document. Furthermore, a drive force from the main unit 2 is transmitted to the conveyance roller gear 422 by a joint member (not shown) that transmits a drive force from the main unit 2 to the opening/closing unit 3. Anything will do as the joint member as long as the drive force is transmittable.

Figure 4:
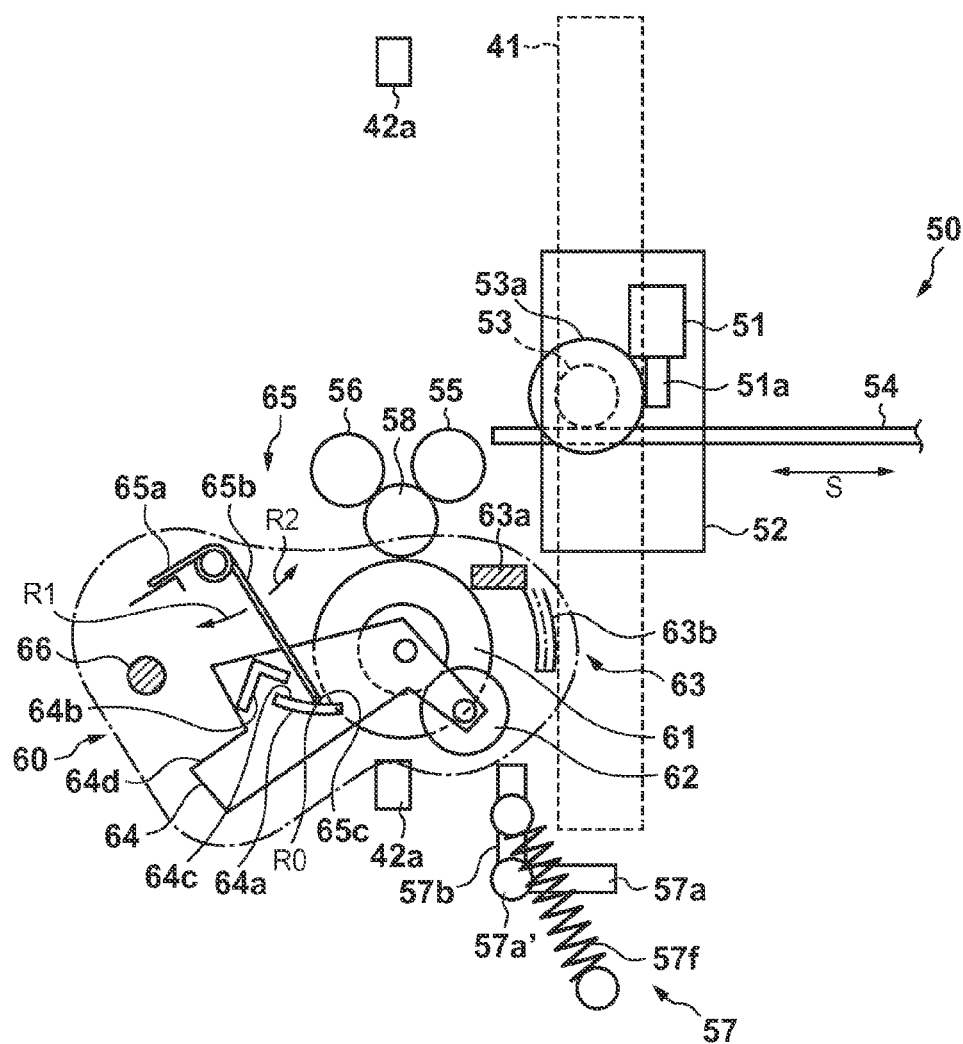
FIG. 4 is a diagram illustrating a moving mechanism, a biasing mechanism, and a disengaging mechanism.

FIG. 4 is a diagram illustrating a moving mechanism 50, a biasing mechanism 57, and a disengaging mechanism 60 of the reading unit 41. First, the moving mechanism 50 will be described. In this embodiment, the moving mechanism 50 adopts a rack and pinion mechanism.

A driving source 51 is a driving source shared by the moving mechanism 50 and the feeding mechanism 42, and is a motor (a stepping motor, for example) here. A gear 51a (a worm gear, for example) is attached to an output shaft of the motor 51. A pinion gear 53 has a gear 53a (a worm wheel, for example), which is fixed coaxially thereto, and the gear 53a meshes with the gear 51a. Therefore, when the motor 51 is rotated, the pinion gear 53 also rotates.

The motor 51 is mounted on a carrier 52 that supports the reading unit 41, and the pinion gear 53 is supported rotatably by a carrier 52. Thus, the motor 51 and the pinion gear 53 are configured to be movable with the reading unit 41.

The moving mechanism 50 includes a rack member 54 extended in the direction S, which is the moving direction of the reading unit 41. The pinion gear 53 meshes with the rack member 54, and makes the reading unit 41 reciprocally movable in the direction S by rotating the pinion gear 53 in response to driving the motor 51 in forward or reverse. Thus, the flat bed scanner 43 in this embodiment constitutes a self-propelled flat bed scanner. Note that the moving mechanism 50 includes, for example, a guide member (not shown) parallel to the rack member 54, which guides the movement of the carrier 52.

In the case of this embodiment, the rack member 54 is not provided in a region where the reading unit 41 can be moved to the fixed reading position P, and the moving mechanism 50 itself is configured to be unable to move the reading unit 41 to the fixed reading position P.

The pinion gear 53 is displaced by the movement of the reading unit 41, and functions as a driving force transmission element to switch the transmission destination (output destination) of driving force of the motor 51 between the moving mechanism 50 and the feeding mechanism 42. Driving force transmission to the feeding mechanism 42 is performed by the pinion gear 53 meshing with an input gear 55.

The input gear 55 is a gear to transmit a driving force to the feeding mechanism 42, and is provided adjacent to the edge of the rack member 54. When the reading unit 41 moves toward the fixed reading position P, the pinion gear 53 is detached from the rack member 54 and meshes with the input gear 55.

A driving force can be transmitted from the input gear 55 through a relay gear 58 to an ADF driving gear 56. The ADF driving gear 56 transmits the driving force to the conveyance roller gear 422 through the joint member (not shown) described above.

Next, a biasing mechanism 57 will be described. The biasing mechanism 57 includes a holding lever 57a and an elastic member 57f. The holding lever 57a is a lever member, which has an L-shape, and is pivotably axis-supported at a pivot center 57a', and contactable with the reading unit 41. The elastic member 57f is a spring, in this embodiment. One end of the spring 57f is fixed to one arm unit 57b of the holding lever 57a, and the other end of the spring 57f is fixed to the main unit 2.

When the reading unit 41 is moved out of the moving reading region from the moving reading region A toward the fixed reading position P by the moving mechanism 50, the biasing mechanism 57 moves the reading unit 41 to the fixed reading position P by a biasing force of the spring 57f. The operation of the biasing mechanism 57 will be described, referring to FIG. 5A to 5C.

FIG. 5A illustrates a state in which the reading unit 41 is in the moving reading region A. FIG. 5B illustrates a state in which the reading unit 41 is located between the moving reading region A and the fixed reading position P. FIG. 5C illustrates a state in which the reading unit 41 is in the fixed reading position P.

As shown in FIG. 5A, when the reading unit 41 is in the moving reading region A, the holding lever 57a is biased clockwise in the diagram by the biasing force of the spring 57f, and abuts against the abutting unit 57g. Furthermore, a lever end portion 57c is in stand-by protruding to the moving path of the reading unit 41.

When the reading unit 41 is moved toward the fixed reading position P by the moving mechanism 50, the lever end portion 57c of the holding lever 57a comes in contact with the left contact portion 41a protruding from the reading unit 41. The holding lever 57a pivots counterclockwise pushed by the reading unit 41 (FIG. 5B).

In the initial stage of a pivoting movement of the holding lever 57a, the pivoting movement of the holding lever 57a elongates the spring 57f. Therefore, the spring 57f resists the counterclockwise pivoting movement of the holding lever 57a. However, when the pivoting movement of the holding lever 57a advances, the pivoting movement of the holding lever 57a contracts the spring 57f. Therefore, the spring 57f biases the holding lever 57a to pivot counterclockwise. Then, a lever end portion 57d comes in contact with a right contact portion 41b of the reading unit 41, and the reading unit 41 is pushed toward the fixed reading position P.

By locating the biasing mechanism 57 such that the spring 57f biases the holding lever 57a to pivot counterclockwise when the reading unit 41 has moved to the end portion of the rack member 54, the reading unit 41 can be moved to the fixed reading position P and kept there (FIG. 5C). As a result, without depending on a driving force of the motor 51, the reading unit 41 can be moved to the fixed reading position P.

Furthermore, in the process when the reading unit 41 moves from a position in FIG. 5A to the fixed reading position P in FIG. 5C, the pinion gear 53 also is displaced and is detached from the rack member 54 and meshes with the input gear 55. As a result, the output of the motor 51 is switched from the moving mechanism 50 to the feeding mechanism 42.

The pinion gear 53 is detached from the rack member 54, and the reading unit 41 is kept at the fixed reading position P by the holding lever 57a, so that the reading unit 41 does not move and stays at the fixed reading position P regardless of the rotation direction of the pinion gear 53. Thus, the document conveyance direction of the feeding mechanism 42 is switchable, because where the driving force of the motor 51 is transmitted to is switched by an apparatus that does not depend on the driving of the motor 51.

Note that, when the reading unit 41 is disengaged from the fixed reading position P, the biasing mechanism 57 operates similarly. In other words, when the reading unit 41 is moved from the fixed reading position P toward the moving reading region by a disengaging mechanism 60, which will be described later, the spring 57f in the biasing mechanism 57 resists to a clockwise pivoting movement of the holding lever 57a in the initial stage of the reverse pivoting movement of the holding lever 57a. However, when the pivoting movement of the holding lever 57a advances, the spring 57f biases the holding lever 57a to pivot clockwise. Then, the reading unit 41 is pushed toward the moving reading region A by the holding lever 57a.

Next, an operation manner of the moving mechanism 50 and the biasing mechanism 57 in the fixed document reading mode and the conveyance document reading mode will be described with FIG. 6A to 6D.

FIG. 6A illustrates a case in a standby state. The reading unit 41 is on standby in a position between the moving reading region A and the fixed reading position P (hereinafter referred to as "standby position"). In the standby position, a white background can be provided in a location opposite to the reading unit 41, and white reference data for an image reading can be obtained by reading this white background before the document reading operation.

Reading Operation in Fixed Document Reading Mode

When a document is placed on the platen glass PG1 and an operation to start reading is performed, the reading unit 41 reads the white reference data, and next, the motor 51 is driven and the reading unit 41 is moved to the moving reading region A. When the reading unit 41 arrives at a reading start position under the platen glass PG1, the reading unit 41 moves to the right in the diagram (FIG. 6B) scanning the surface of the document.

Here, for the sake of simplicity, a rotation direction of the motor 51 is assumed to be forward rotation when the reading unit 41 is moved to the right in the diagram. When the motor 51 rotates forward, the pinion gear 53 rotates clockwise. Since the pinion gear 53 meshes with the rack member 54, the carrier 52 and the reading unit 41 to which the pinion gear 53 is attached can move to the right unitarily. When the reading of a predetermined length ends, the forward rotation of the motor 51 is stopped and the movement of the reading unit 41 to the right is stopped.

When the motor 51 rotates in reverse, the situation described above is reversed and the reading unit 41 can move to the left in the diagram. After completing the reading, the motor 51 rotates in reverse, and the reading unit 41 is moved to the left in the diagram, and stops when returned to the standby position to be put into the standby state.

Transport Document Reading Mode

When a document is set in a document tray 47, a document detection sensor (not shown) detects the document. Here, if an operation to start reading is performed, the reading unit 41 in the standby position reads the white reference data, then the motor 51 is rotated in reverse to move the reading unit 41 to the left in the diagram, in other words, toward the fixed reading position P.

Since the holding lever 57a is on standby protruding the lever end portion 57c to the moving path of the reading unit 41, as described above, when the reading unit 41 moves to the left, the contact portion 41a of the reading unit 41, in time, comes in contact with the lever end portion 57c. When the reading unit 41 moves further to the left, in other words, toward the fixed reading position P, the contact portion 41a pushes the lever end portion 57c, and as a result, the holding lever 57a pivots counterclockwise.

As described above, in the initial stage of the pivoting movement of the holding lever 57a, the holding lever 57a functions to bias clockwise, in other words, bias the reading unit 41 to be pushed back to the right. However, since the rack member 54 meshes with the pinion gear 53, the reading unit 41 can be moved further to the left by the drive force from the motor 51 against the counter-force to the right.

When the reading unit 41 moves further to the left, the pivoting bias force of the holding lever 57a switches to counterclockwise as described above, and in reversal, a force works to pull the reading unit 41 toward the fixed reading position P (FIG. 6C).

Subsequently, the pinion gear 53 reaches the end portion of the rack member 54 and is disengaged from the rack member 54. The reading unit 41 moves to the left by the counterclockwise pivoting bias force of the holding lever 57a, and the pinion gear 53 meshes with the input gear 55, this time (FIG. 6D).

Thus, when the reading unit 41 arrives at the fixed reading position P, the pinion gear 53 transits from the state in which it meshes with the rack member 54 to the state in which it meshes with the input gear 55. Further, as described above, the reading unit 41 is kept at the fixed reading position P by a pushing pressure of the holding lever 57a caused by the bias of the spring 57f.

Accordingly, regardless whether the motor 51 is driven forward or in reverse, the reading unit 41 does not move and is kept at the fixed reading position P, and the drive force of both forward and reverse rotation from the motor 51 is transmitted to the feeding mechanism 42.

In the case of this embodiment, if the motor 51 continues to be rotated in reverse further after the reading unit 41 arrives at the fixed reading position P, the conveyance roller gear 422 is driven clockwise in FIG. 3, in other words, in the direction opposite to the conveyance direction. At this time, the planetary gear 424 meshes with the separation roller gear 421, and drives the separation roller gear 421 clockwise.

Thus, the separation roller unit 44 is driven in the conveyance direction, and the conveyance roller unit 45 and the output roller unit 46 are driven reversely from the conveyance direction. The document set in the document tray 47 is separated sheet by sheet in the separation roller unit 44, and is conveyed to the conveyance roller unit 45.

Since the conveyance roller unit 45 rotates in a direction opposite to the conveyance direction, the document stops in the state where the front edge of the document abuts against the nip unit of the conveyance roller unit 45 that rotates in reverse. By further pushing the document by a predetermined amount and flexing it, a skew correction can be performed by making the front edge of the document follow the nip line of the conveyance roller unit 45.

Subsequently, by switching the rotation direction of the motor 51 to forward rotation, the conveyance roller unit 45 and the output roller unit 46 are driven in the conveyance direction. Then, the reading of the document is performed by conveying the document after the skew correction and passing it above the reading unit 41, which is fixed at the fixed reading position P. The document that has been read is output to an output tray 48. If there is a next document, the motor 51 rotates in reverse again, and the paper is fed sheet by sheet. And after the skew correction, the motor 51 is rotated forward and the conveyance reading is performed. The operation described above is repeated until there are no documents left in the document tray 47.

Disengagement from Fixed Reading Position P

Next, referring to FIG. 4, a disengaging mechanism 60 will be described. The disengaging mechanism 60 disengages the reading unit 41 from the fixed reading position P to the standby position toward the moving reading region A against the biasing force of the biasing mechanism 57, using the driving force of the motor 51.

The disengaging mechanism 60 includes a sun gear 61 that receives a drive force of the motor 51, a rotation arm 64 (carrier), and a planetary gear mechanism that includes a planetary gear 62. The sun gear 61 is constituted by a large diameter gear and a small diameter gear, which are coaxially fixed, and the large diameter gear meshes with the relay gear 58. The small diameter gear meshes with the planetary gear 62.

The rotation arm 64 supports rotatably the planetary gear 62 at its end. Since the rotation arm 64 is provided coaxially with the sun gear 61 pivotably, the planetary gear 62 is supported coaxially with the sun gear 61 pivotably, by the rotation arm 64. Therefore, the planetary gear 62 pivots counterclockwise or clockwise in FIG. 4 depending on whether the motor 51 is driven forward or in reverse, and constitutes a driving unit that is driven by receiving the drive of the motor 51.

The disengaging mechanism 60 further includes an engaging portion 63, which is able to engage with the planetary gear 62. The engaging portion 63 includes an abutting unit 63a and a fixed gear unit 63b (ring gear). The fixed gear unit 63b, which is provided with a partial internal gear, is located on the pivot locus of the planetary gear 62, and is configured to be able to mesh with the planetary gear 62. The abutting unit 63a comes in contact with the planetary gear 62 and restricts the counterclockwise pivoting movement. The abutting unit 63a comes in contact with the planetary gear 62 at a portion other than the portion where the teeth are formed (for example, a boss portion, a flange portion, or the like).

When the planetary gear 62 pivots counterclockwise, meshes with the fixed gear unit 63b, and further comes in contact with the abutting unit 63a, the planetary gear 62 is put into an engagement state in which it is not able to pivot and rotate counterclockwise. In the disengagement state, the sun gear 61, the relay gear 58, and the input gear 55 are rotatable, but, in the engagement state, the sun gear 61, the relay gear 58, and the input gear 55 are also put into a locked state in which they are unable to rotate.

If the motor 51 continues to be rotated forward in this state, since the drive train is locked, a force is generated to move the pinion gear 53 to the right with respect to the input gear 55. In other words, the reading unit 41 is made movable in the direction to disengage from the fixed reading position P. Here, a torque of the motor 51 is set so that the reading unit 41 can disengage against the biasing force of the biasing mechanism 57. Note that the position of the fixed gear 63b (phase of meshing with planetary gear 62) is set so that when the drive train is locked, the pinion gear 53 meshes smoothly with the rack member 54 separating from the input gear 55. Thus, the reading unit 41 becomes able to disengage from the fixed reading position P.

An engaging state between the planetary gear 62 and the engaging portion 63 has to be established when disengaging the reading unit 41 from the fixed reading position P. Therefore, in this embodiment, an engagement state and a disengagement state between the planetary gear 62 and the engaging portion 63 is configured to be switched by a driving pattern of the motor 51. In other words, when the motor 51 is driven in a predetermined specific driving pattern, the reading unit 41 is disengaged from the fixed reading position P. The configuration to realize this will be described below.

A control member 65 engages with a rotation arm 64, and is a lever-like member to restrict a pivoting manner of the rotation arm 64. The control member 65 is constituted by a torsion coil-like spring member, includes a coil portion 65a and a lever portion 65b, and is supported at the coil portion 65a. The lever portion 65b is flexible at the coil portion 65a as the center, and can flex elastically in a direction shown in the arrow R1 or the arrow R2 in the diagram. Furthermore, the lever portion 65b is biased to an initial position R0 (position in FIG. 4) by an elastic force of the coil portion 65a, and is located at the initial position R0 when there is no load.

The rotation arm 64 is provided with cam portions 64a, 64b, and 64c. At the edge of the lever portion 65b, a cam follower portion 65c is provided as a sliding portion to slide with the cam portions 64a, 64b, and 64c. A stopper member 66 abuts against an abutting unit 64d of the rotation arm 64, and restricts the rotation arm 64 to pivot clockwise further.

The rotation arm 64 is controlled by the cam follower portion 65c that slides with the cam portions 64a, 64b, and 64c for the pivoting movement, and is configured to transit among a reverse driving position, a forward driving position, a switchable position, and a disengaging position, which will be described later. FIG. 7 is a diagram, which illustrates the state transition of the rotation arm 64 describing the transition manner among respective positions, and the state of the rotation arm 64 in each position.

State SS4 shows a state in which the motor 51 rotates in reverse, and the rotation arm 64 pivots clockwise to abut against the stopper member 66, and a clockwise pivoting movement of the rotation arm 64 is restricted. At this moment, since there are no counterparts to mesh with, the planetary gear 62 rotates freely. Hereinafter, this state is referred to as "reverse driving position".

When the motor 51 rotates forward, in this state, the sun gear 61 rotates counterclockwise, and the rotation arm 64 also pivots counterclockwise. Accordingly, the cam follower portion 65c of the control member 65 comes in contact with the cam portion 64a of the rotation arm 64. If the rotation arm 64 pivots counterclockwise further, the cam follower portion 65c flexes in a direction shown by R1 along the cam portion 64a, and the rotation arm 64 continues to pivot counterclockwise pushing out the cam follower portion 65c.

When the cam follower portion 65c arrives at the end portion of the cam portion 64a, an engagement between the cam follower portion 65c and the cam portion 64a is resolved. As a result, the lever portion 65b of the control member 65 tries to return to the initial position R0 by its elastic force, and engages with the cam portion 64b disposed along the cam portion 64a.

The cam portion 64b engages with the cam follower portion 65c, and the counterclockwise pivoting movement of the rotation arm 64 is stopped and maintained by the cam follower portion 65c. Afterwards, even though the motor 51 continues to rotate forward, the rotation arm 64 is kept at the stopped state, and the planetary gear 62 is put into a state of free rotation at that position (state SS1). Hereinafter, this state is referred to as "forward driving position".

If the motor 51 rotates in reverse in the forward driving position, the rotation arm 64 begins to pivot clockwise, and the engagement between the cam follower portion 65c and the cam portion 64b is resolved. The lever portion 65b returns to the initial position R0 by the spring force (state SS2). Further, by driving the motor 51 in reverse, the rotation arm 64 pivots clockwise, and the cam follower portion 65c comes in contact with the cam portion 64c. If the rotation arm 64 pivots clockwise further, the cam follower portion 65c flexes in a direction shown by R2 along the cam portion 64c, and the rotation arm 64 continues to pivot clockwise pushing out the cam follower portion 65c.

When the cam follower portion 65c arrives at the end portion of the cam portion 64c, the engagement between the cam follower portion 65c and the cam portion 64c is resolved, and the lever portion 65b of the control member 65 returns to the initial position R0 by its elastic force. The rotation arm 64 pivots clockwise until the abutting unit 64d abuts against the stopper member 66, stops the pivoting movement, and returns to the reverse driving position (state SS4).

The rotation arm 64 is switched to the reverse driving position if driving by at least a predetermined drive amount when the rotation arm 64 is in the forward driving position, and is kept at that position. Similarly, the rotation arm 64 is switched to the forward driving position if driving by at least a predetermined drive amount when the rotation arm 64 is in the reverse driving position, and is kept at that position.

Here, if the motor 51 is rotated in reverse when the rotation arm 64 is in the forward driving position, the rotation arm 64 pivots clockwise, and the engagement between the cam portion 64b and the cam follower portion 65c is resolved, and the control member 65 returns to the initial position R0.

If the rotation direction of the motor 51 is switched to forward rotation in this state, the rotation arm 64 is made pivotable further counterclockwise beyond the forward driving position, without contacting the cam follower portion 65c (state SS2). Hereinafter, this state is referred to as "switchable position".

If the motor 51 is further rotated forward in the switchable position, the planetary gear 62 approaches the fixed gear 63b, and in the end, the planetary gear 62 meshes with the fixed gear 63b. The inner teeth gear of the fixed gear 63b are formed concentrically with the locus of the planetary gear 62, and the planetary gear 62 moves the rotation arm 64 counterclockwise meshing with the fixed gear 63b.

The abutting unit 63a is provided at the end portion of the fixed gear 63b, and if the motor 51 continues to be rotated forward, the planetary gear 62 abuts against the abutting unit 63a in the end, and the counterclockwise pivoting movement of the rotation arm 64 is restricted (state SS3). Hereinafter, this state is referred to as "disengaging position".

When the rotation arm 64 is in the forward driving position, if a small amount of driving of reverse rotation of the motor 51 is applied, which is not enough to switch from the forward driving position to the reverse driving position, and then the motor 51 is rotated forward, the position can be switched to the disengaging position.

When the rotation arm 64 is in the disengaging position, if the motor 51 continues to be rotated forward, the driving system from the motor 51 to the planetary gear 62 is put into a state in which the rotation is locked, and the reading unit 41 is disengaged from the fixed reading position P, described above.

Similarly, when the rotation arm 64 is in the disengaging position, if the motor 51 is rotated in reverse, the rotation arm 64 pivots clockwise and meshing between the planetary gear 62 and the fixed gear 63 is resolved, thus the cam follower portion 65c comes in contact with the cam portion 64c. Rotated in reverse further, a transition operation to the reverse driving position described above is performed.

Hereinafter, a transition manner of the rotation arm 64 among each position is summarized.

If the motor 51 rotates in reverse when the rotation arm 64 is in the reverse driving position (SS4), the reverse driving position is maintained, and if the motor 51 is rotated forward by a predetermined amount (for example, n steps), the position transits to the forward driving position (SS1).

Similarly, when in the forward driving position (SS1), even if the motor 51 is rotated forward, the forward driving position is maintained, and the position transits to the switchable position (SS2) by a reverse rotation of a predetermined driving amount (for example, m steps). When in the switchable position (SS2), the position transits to the disengaging position (SS3) by a forward rotation of a predetermined driving amount (for example, p steps), and transits to the reverse driving position (SS4) by a reverse rotation of (n−m) steps.

When in the disengaging position (SS3), if the forward rotation of motor 51 continues, the disengaging position is maintained, and the position transits to the switchable position (SS2) by a reverse rotation of p steps. As is obvious from FIG. 7, regardless which position the rotation arm 64 is in, it necessarily transits to the reverse driving position (SS4) by a continuing driving for more steps than whichever is larger of the reverse drive of n steps and the reverse drive of (p+n−m) steps. In other words, initializing of the position (transition to the reverse driving position) is possible by a reverse rotation of the motor 51 by a predetermined drive amount. Thereafter, the position can transit to the disengaging position (SS3) by a forward rotation of n steps, a reverse rotation of m steps, and a forward rotation of p steps.

Control Example

An exemplary control of the reading operation of the image reading apparatus 1 will be described, referring to FIGS. 8A and 8B, and FIGS. 9A and 9B. The control of the image reading apparatus 1 is performed by a control unit of the image reading apparatus 1. The control unit includes, for example, CPU, storage unit (RAM, ROM), interface unit, and the like.

FIG. 8A illustrates an exemplary control of a reading operation in the fixed document reading mode. When a document is placed on the platen glass PG1, and a reading start operation is performed (ST01), the process advances to the fixed document reading mode, and the reading unit 41 reads image data of reading white background, and performs a shading correction and a home positioning of the reading unit 41 (ST02). The reading unit 41 is moved by a forward rotation of the motor 51 (ST03), and when it arrives at the reading start position, image reading is performed line by line (ST04). When it reaches a predetermined line number according to the length of the document (ST05), reading is stopped and the motor 51 is stopped (ST06). Thereafter, the reading unit 41 returns to the home position by a reverse rotation of the motor 51, and the reading operation is completed (ST07).

FIG. 8B and FIG. 9A illustrate an exemplary control of a reading operation in the conveyance document reading mode. When a document is set in the document tray 47, a document set detection sensor (not shown) detects that a document is set. If a reading start operation is performed (ST11) here, the process transits to the conveyance document reading mode, and the reading unit 41 reads image data of reading white background, and performs a shading correction and a home positioning of the reading unit 41 (ST12). The motor 51 is rotated in reverse for a driving amount necessary to move the reading unit 41 toward the fixed reading position P (for example, r steps) (ST13), and the reading unit 41 is moved to and kept at the fixed reading position P by the biasing mechanism 57. In this state, a drive of the motor 51 is transmittable to the feeding mechanism 42.

Next, referring to FIG. 9A, operations in which paper conveyance of a document, reading image, and outputting the document to the output tray 48 are performed will be described.

The motor 51 is rotated in reverse and a document is picked up (ST21). After the front edge of the document is detected by a document front edge detection sensor (not shown), the motor 51 is rotated in reverse at a predetermined amount (for example, s steps) to convey the document. By this, the front edge of the document is contacted with a nip of the conveyance roller unit 45, and a registration correction is performed (ST22).

A gear ratio is designed so that the amount of reverse drive from ST21 to ST22 is larger than the n steps or (n−m+p) steps described above, and the rotation arm 64 is necessarily in the reverse driving position.

Subsequently, the motor 51 is switched to forward rotation, and the motor 51 is driven at a predetermined amount (for example, t steps), and the document is conveyed on the ADF glass PG2, and a start position for the document is detected (ST23). After the start position is detected, line-by-line image reading is performed by conveying the document (ST24), and when the back end of the document arrives at the reading position (ST25), the reading is completed. The motor 51 is rotated forward by a predetermined amount (for example, u steps), and the document is output to the output tray 48 (ST26).

Since the gear ratio is designed so that the forward rotation amount from ST23 to ST26 is larger than n steps as described above, the rotation arm 64, which was in the reverse driving position, necessarily shifts to the forward driving position.

If there is a next document (ST27), the steps from ST21 to ST26 are repeated, and if there is not a next document, the conveyance document reading mode is completed (ST27). In the case where there is a next document, the rotation arm 64 transits between the reverse driving position and the forward driving position, alternately, but does not transit to the disengaging position, and the disengaging mechanism 60 will not be driven during a reading operation in the conveyance document reading mode.

Next, referring to FIG. 9B, an exemplary control in a case where disengaging the reading unit 41 from the fixed reading position P is performed will be described. At a point when a document output is completed in the conveyance document reading mode, the rotation arm 64 is in the forward driving position. Then, the motor 51 is rotated forward at a predetermined amount (for example, p steps) (ST32), after being rotated in reverse at a predetermined amount (for example, m steps) (ST31), and the rotation arm 64 transits to the disengaging position. In this state, by continuing the forward rotation of the motor 51 further, the reading unit 41 is disengaged from the fixed reading position P. By reading the reading white background with moving the reading unit 41 with a forward rotation, the home position of the reading unit 41 is detected (ST33), the motor 51 is stopped, and the state returns to the standby state.

Accordingly, by providing a disengaging mechanism 60, which operates by a specific combination of patterns of forward/reverse rotation of the motor 51, a forward/reverse rotation of both the moving mechanism 50 and the feeding mechanism 42 is realized using a single motor in common, and document reading modes can also be switched.

Furthermore, it will not restrict functionality of an image reading apparatus having two motors, and an addition of a mechatronic part such as electromagnetic clutch and the like is not required. Similarly, switching of the conveyance direction in the conveyance document reading mode can be performed simply by switching the rotation of the motor 51, thus there is no time loss. Accordingly, the conveyance document reading mode and the fixed document reading mode can be performed with almost identical sequence with an image reading apparatus having two motors, and a reduction of throughput can be minimized.

Second Embodiment

In the first embodiment described above, although as a moving mechanism 50 and a flat bed scanner 43, a rack and pinion mechanism and a self-propelled flat bed scanner are adopted, respectively, a belt transmission mechanism can be adopted as a moving mechanism. In the following, a description will be given for a case where a belt transmission mechanism is adopted. Note that elements that function or operate similarly to those in the first embodiment will be given the same numerals, and thus their further description will be omitted.

Figure 10A:
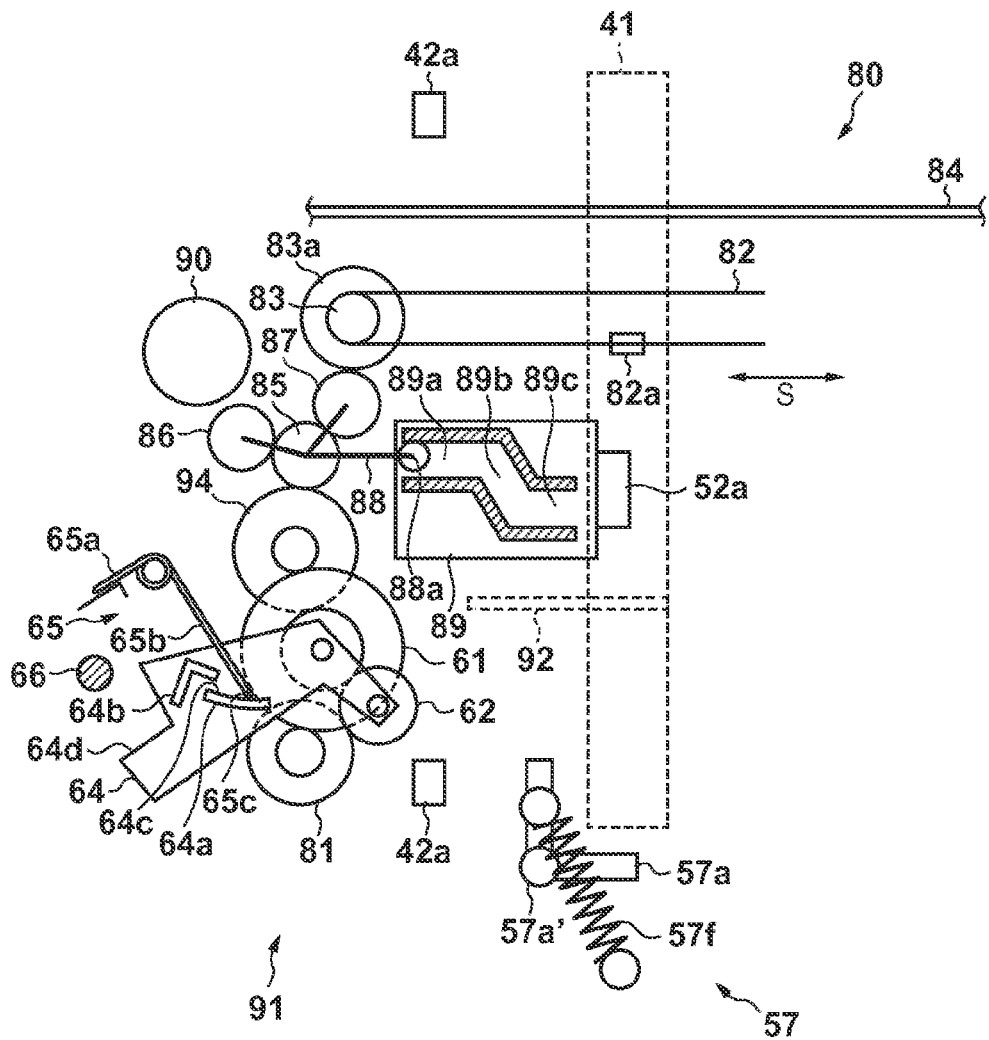
FIGS. 10A and 10B are diagrams illustrating an exemplary mechanism in a case where another exemplary moving mechanism is adopted.

FIG. 10A illustrates a moving mechanism 80, a biasing mechanism 57, and a disengaging mechanism 60 in this embodiment. The moving mechanism 80 includes a pair of pulleys 83 (only one of these are shown in FIG. 10A), a belt 82 wound around the pair of pulleys 83, a guide shaft 84, which guides a reciprocating movement of a reading unit 41. A carrier (not shown) of the reading unit 41 is connected to the belt 82 at a connection portion 82a. Thus, by rotating the pulley 83, the belt 82 runs and the reading unit 41 can be moved. On the pulley 83, a gear 83a is fixed coaxially.

A driving source 81 is a common driving source for the moving mechanism 80 and the feeding mechanism 42, and is a motor (for example, stepping motor), here. A gear 81a is attached to the output shaft of the motor 81, and the gear 81a, in a case of this embodiment, meshes with a large radius gear of a sun gear 61 in the disengaging mechanism 60. A drive force of the motor 81 is transmitted from the sun gear 61 as an input gear to the gear 83a of the pulley 83 through a relay gear 94 and a drive switch gear (sun gear) 85. A driving system is configured in which when the motor 81 is rotary driven clockwise in FIG. 10A, the pulley 83 is rotary driven counterclockwise, and the reading unit 41 is moved to the right (toward moving reading region A). Hereinafter, when the motor 81 rotates clockwise is defined as the forward rotation direction, for convenience sake.

An ADF drive gear 90 performs drive transmission with a conveyance roller gear 422 in the feeding mechanism 42 through a joint member (not shown).

A planetary gear mechanism is constituted by a drive switch gear (sun gear) 85, a first planetary gear 87, a second planetary gear 86, and a rotation arm (carrier) 88. The rotation arm 88 is rotatably supported coaxially with the drive switch gear 85. The planetary gears 86 and 87 are rotatably supported by the rotation arm 88, and pivot concurrently when the rotation arm 88 pivots.

The planetary gear 87 is pivotable between the position in which it meshes with the gear 83a of the pulley 83 (in other words, a gear in the moving mechanism), and the position in which it does not mesh therewith. The planetary gear 86 is pivotable between the position in which it meshes with the ADF drive gear 90 (in other words, a gear in the feeding mechanism), and the position in which it does not mesh therewith. In a case where the planetary gear 87 meshes with the gear 83a of the pulley 83, the planetary gear 86 does not mesh with the ADF drive gear 90, and in a case where the planetary gear 86 meshes with the ADF drive gear 90, the planetary gear 87 does not mesh with the gear 83a of the pulley 83.

Figure 10B:
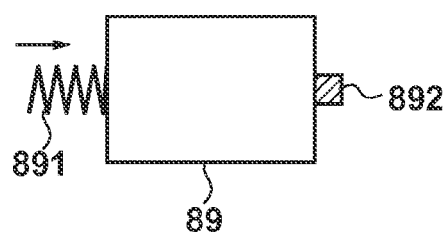

A driving switch plate 89 restricts a pivoting movement of the rotation arm 88. The driving switch plate 89 is provided with groove-like cam portions 89a, 89b, and 89c. A cam follower portion 88a is provided at one end of the rotation arm 88, as a sliding portion to slide with the cam portions 89a, 89b, and 89c. The driving switch plate 89 is configured to be movable parallel to the moving direction S of the reading unit 41 in FIG. 10A. Furthermore, as shown in FIG. 10B, the cam portions 89a, 89b, and 89c are continuously connected, and have a groove-like form, and by moving the driving switch plate 89, the cam follower portion 88a engages continuously with cam portions 89a, 89b, and 89c.

Figure 12:
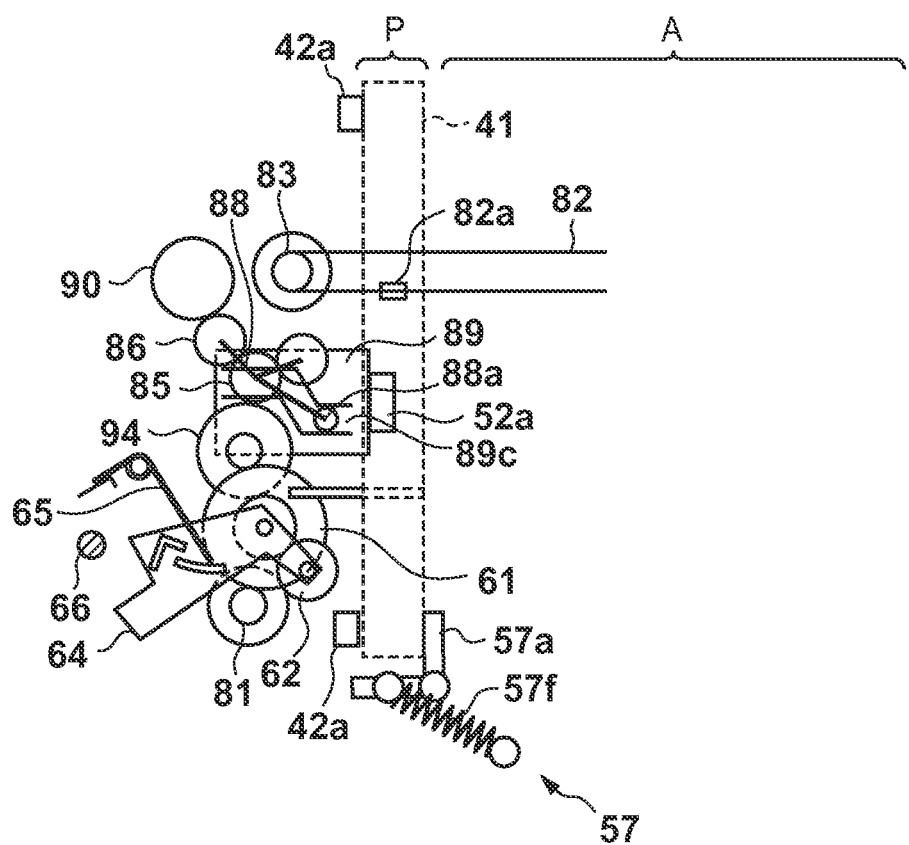
FIG. 12 is a diagram illustrating an operation of the exemplary mechanism in FIGS. 10A and 10B.

Hereinafter, a manner in which the driving switch plate 89 restricts the pivoting movement of the rotation arm 88 will be described. FIG. 11A illustrates a state in which the reading unit 41 is in the side of the moving reading region A. FIG. 11B illustrates a state in which the reading unit 41 is in a position between the moving reading region A and the fixed reading position P. FIG. 12 illustrates a state in which the reading unit 41 is in the fixed reading position P.

In the diagram, the biasing mechanism 57 operates similarly with the first embodiment described above. The driving switch plate 89 is biased by a spring 891, and is on standby at a position in the right side of the movable region contacting with a stopper 892, as shown in FIG. 10B.

A carrier (not shown), which supports the reading unit 41, is provided with an engaging portion 52a, which engages with the driving switch plate 89, and is configured to push to move the driving switch plate 89 to the left against the spring 891, as the reading unit 41 moves to the left.

When the motor 81 rotates in reverse, in FIG. 11A, the reading unit 41 moves to the left, and the engaging portion 52a comes in contact with the driving switch plate 89 and starts pushing the driving switch plate 89 to move to the left. The cam follower portion 88a, which engaged with the cam portion 89a, according to the movement of the driving switch plate 89 to the left, engages with the cam portion 89b. As a result, the rotation arm 88 starts to pivot clockwise, and finally, the engagement between the planetary gear 87 with the gear 83a of the pulley 83 is resolved (FIG. 11B).

At this time, since the rotational biasing force of the holding lever 57a is in the counterclockwise direction, even if the drive transmission to the pulley 83 is cut off, the reading unit 41 continues to move to the left, in other words, toward the fixed reading position P, by the holding lever 57a. According to the movement of the reading unit 41 toward the fixed reading position P, the driving switch plate 89 slides to move to further left, and the cam portion 89c engages with the cam follower portion 88a (FIG. 12).

At this time, the reading unit 41 is kept at the fixed reading position P by the holding lever 57a, the rotation arm 88 is in a state in which the planetary gear 86 is kept in a position meshing with an ADF drive gear 90, and a drive force of the motor 81 is transmittable to the feeding mechanism 42. Furthermore, since a pivoting movement of the rotation arm 88 is restricted by the driving switch plate 89, a rotary drive force of the motor 81 is transmitted to the feeding mechanism 42 regardless of forward rotation/reverse rotation.

Next, a disengagement method of the reading unit 41 from the fixed reading position P, according to this embodiment, will be described. In this embodiment, instead of the engaging portion 63 in the first embodiment described above, an engaging portion 92 is provided. The engaging portion 92 is fixed to the reading unit 41, is a rack member in which teeth are formed parallel to the moving direction of the reading unit 41, and is engageable to the planetary gear 62 by meshing with the planetary gear 62.

The engaging portion 92 is disposed so that a part thereof overlaps with a rotation locus of the planetary gear 62 when the reading unit 41 is in the fixed reading position P, and is disposed meshable with the planetary gear 62. Although a pivoting movement of the rotation arm 64 is restricted when the engaging portion 92 meshes with the planetary gear 62, the planetary gear 62 further rotates clockwise. As a result, a rack 92 is pushed to the right, in other words, the reading unit 41 can be disengaged from the ADF position.

The movements of the rotation arm 64 and the control member 65 are similar to the first embodiment described above, and the disengaging mechanism 60 is activated by a specific driving pattern, and the reading unit 41 can be disengaged from the fixed reading position P. Note that by replacing the relationship between the engaging portion 92 and the planetary gear 62 with a configuration in which an eccentric cam and a planetary gear are used, a similar function can be realized.

While the present invention has been described with reference to exemplary embodiments, it is to be understood that the invention is not restricted to the disclosed exemplary embodiments. The scope of the following claims is to be accorded the broadest interpretation so as to encompass all such modifications and equivalent structures and functions.

This application claims the benefits of Japanese Patent Application No. 2012-167646, filed Jul. 27, 2012, which is hereby incorporated by reference herein in its entirety.

What is claimed is:

1. An image reading apparatus comprising:
a reading unit configured to read a document on a platen;
a feeding mechanism configured to convey a document when reading a document that is conveyed onto the platen in which the reading unit is fixed at a predetermined position;
a moving mechanism configured to move the reading unit when reading a document that is placed on the platen in which the reading unit is moved within a reading region that is separated from the predetermined position;
a driving source that is shared by the moving mechanism and the feeding mechanism;
a biasing mechanism that includes an elastic member and is configured to move the reading unit to the predetermined position by a biasing force of the elastic member in a case where the reading unit is moved from the reading region out of the reading region by the moving mechanism;
a transmission element configured to be displaced by the movement of the reading unit, and to switch between transmission of the drive force of the driving source to the moving mechanism and transmission of the drive force of the driving source to the feeding mechanism; and,
a disengaging mechanism configured to disengage the reading unit that is in the predetermined position to the reading region from the predetermined position by the drive force of the driving source.

2. The image reading apparatus according to claim 1, wherein the disengaging mechanism disengages the reading unit from the predetermined position toward the reading region in a case where the driving source is driven in a predetermined specific driving pattern.

3. The image reading apparatus according to claim 2, wherein the disengaging mechanism includes:
a driving unit configured to be driven by a drive force of the driving source, and
an engaging portion configured to be engageable with the driving unit,
wherein a state in which the driving unit engages with the engaging portion and a state in which the driving unit does not engage with the engaging portion are switched according to a driving pattern of the driving source, and the reading unit is disengaged from the predetermined position toward the reading region by the drive force caused by an engagement between the driving unit and the engaging portion.

4. The image reading apparatus according to claim 3, wherein the moving mechanism includes a rack member that extends in the moving direction of the reading unit, the transmission element is a pinion gear that meshes with the rack member,
the driving source and the pinion gear are configured to be movable with the reading unit,
the pinion gear disengages from the rack member and meshes with an input gear that transmits a drive force to the feeding mechanism, due to the movement of the reading unit to the predetermined position by the biasing mechanism,
the input gear is rotatable in a case where the driving unit and the engaging portion are in a disengaged state, and
the input gear is locked, and the reading unit is disengaged from the predetermined position toward the reading region by a rotation of the pinion gear that meshes with the input gear, in a case where the driving unit and the engaging portion are in an engaged state.

5. The image reading apparatus according to claim 3, wherein the disengaging mechanism includes:
a planetary gear mechanism that includes a planetary gear as the driving unit, and a carrier that supports pivotably the planetary gear,
a cam portion provided at the carrier, and
a control member that includes a sliding portion that slides with the cam portion and restricts a pivot manner of the carrier.

6. The image reading apparatus according to claim 3, wherein the transmission element includes a first planetary gear that is pivotable between a position in which it meshes with a gear in the moving mechanism and a position in which it does not mesh therewith, and a second planetary gear that is pivotable along with the first planetary gear between a position in which it does not mesh with a gear in the feeding mechanism and a position in which it meshes therewith, and
the engaging portion is fixed to the reading unit.

7. The image reading apparatus according to claim 6, wherein the engaging portion is a rack member, and the driving unit is a planetary gear that engages with the rack member by meshing therewith.

8. The image reading apparatus according to claim 6, comprising:
a cam portion configured to be movable according to a movement of the reading unit, and
a carrier that includes a sliding portion that slides with the cam portion, and supports pivotably the first and the second planetary gears.

9. The image reading apparatus according to claim 1, wherein the biasing mechanism includes a lever member that is made pivotable and contactable with the reading unit, and
the elastic member is disposed such that in a case where the reading unit is moved out of the reading region from the reading region, the lever member pushes the reading unit to the predetermined position, and in a case where the reading unit is moved from the predetermined position toward the reading region, the lever member pushes the reading unit toward the reading region.

* * * * *